UNITED STATES PATENT OFFICE.

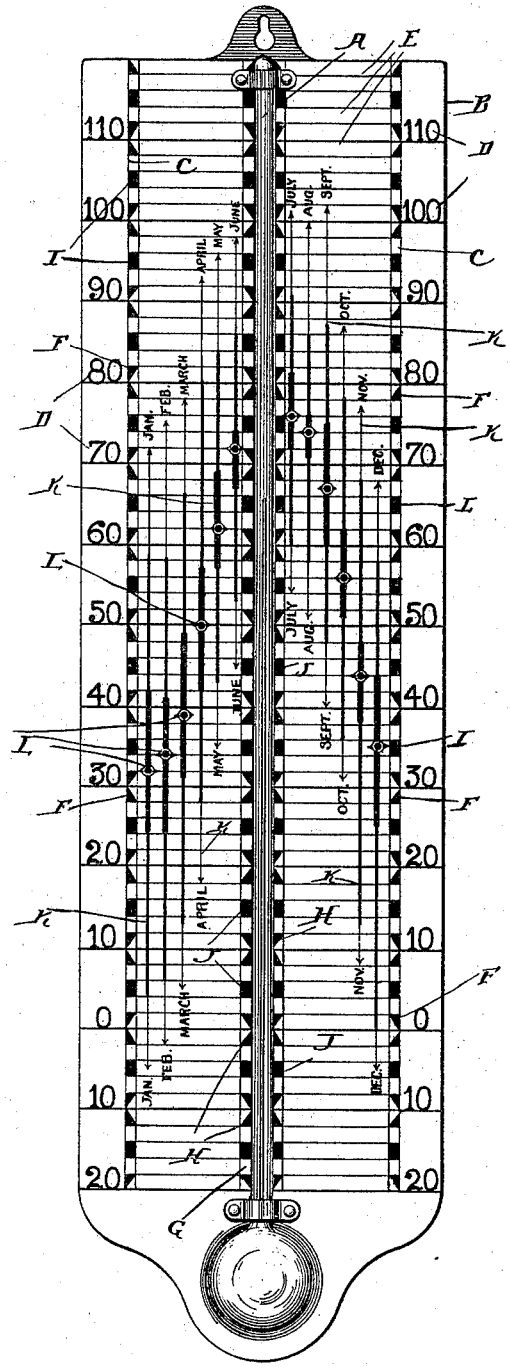

JAMES E. BROWN, OF PHILADELPHIA, PENNSYLVANIA.

THERMOMETER-CHART.

SPECIFICATION forming part of Letters Patent No. 584,667, dated June 15, 1897.

Application filed August 21, 1896. Serial No. 603,528. (No model.)

*To all whom it may concern:*

Be it known that I, JAMES E. BROWN, a citizen of the United States, residing at Philadelphia, in the county of Philadelphia and State of Pennsylvania, have invented certain new and useful Improvements in Temperature-Charts, of which the following is a specification.

This invention relates to a new and useful improvement in thermometers, and has for its object to provide demarcations upon the face of a thermometer by means of which the normal temperature, the highest or lowest monthly mean temperature, the highest or lowest daily mean temperature, and the highest or lowest temperature in any given month of the year above or below the mean average for a number of years may be easily read, in order that the indications of the thermometer upon any given day may be compared with this mean or average temperature.

With these ends in view this invention consists in the details of construction and combination of elements hereinafter set forth, and then specifically designated by the claim.

In order that those skilled in the art to which this invention appertains may understand how to make and use the same, the construction and operation will now be described in detail, referring to the accompanying drawing, forming a part of this specification, which represents the face of a thermometer having my improved chart indicated thereon.

In carrying out my invention I mount the thermometer A upon a back B of sufficient width to permit the inscribing upon the front surface thereof my improved indications, which consists of the parallel border-lines C at a distance from the edge of the back board, so as to leave sufficient space to accommodate the usual thermometer-scale numbers D. These numbers are arranged in the ordinary manner in columns upon the cross-lines which indicate the degrees Fahrenheit to be registered by the fluid within the bulb, and, as is usual, the main cross-lines which are indicated by these numbers are 10° apart.

Between the border-lines C are inscribed the sublines E, which indicate 2° and extend from one border to the other, and in order that these lines may be readily discerned and easily calculated from the given main division I place within the border-lines the angle-spots F, which are of some prominent color relative to the background upon which they are placed, and should said background be white these spots would preferably be black, and they are so arranged that one of the vertices rests upon one of the main divisions in the thermometer-scale, thus bringing two of said spots next adjacent each other in such manner as to form a V-shaped figure, as clearly shown, and this will add prominence to the main division, so that the latter may be determined at some distance, and also will assist the eye in following this main division to the point where it intersects the tube, and as a further means of assisting the eye in following these divisions I arrange parallel lines G next adjacent the bulb and upon either side thereof similar in all respects to the border-lines and place therein the spots H in the same manner as the spots F are placed in the border-lines, except that these spots are reversed. By this arrangement the 4° next adjacent each one of the main divisions of the scale will be indicated, and in order that there may be no confusion between these divisions and the divisions lying next thereto the central subdivisions between each of the main divisions are connected by a rectangular spot I, thus leaving throughout the entire scale a light spot between each alternate subdivision, with the exception that between the subdivisions are lines immediately upon each side of the main divisions. Rectangular spots J are placed within the lines G, so as to correspond with the spots I, and by this arrangement the reading of the thermometer at a distance is greatly facilitated.

Within the space between each of the border-lines and the lines G, which lie next adjacent the tube, are inscribed six vertical lines K, each of which is of varying thicknesses, for the purpose hereinafter set forth, and each of these lines indicates a month of the year, there being twelve in all.

At or near the center of each of these lines is located a circle L, which registers with the degree upon the thermometer-scale indicating the normal temperature of the month which the vertical line represents, and extending upward and downward from this circle is the thickest portion of each line, and this thickest portion represents the highest or lowest normal mean temperature for that month and the ends thereof terminating upon the degree which indicates that temperature. Extending in either direction, both up and down, from the thickened portion of each of the vertical lines is a portion of said lines which is of less thickness than the central portion and indicates the highest daily mean temperature of the month, and the upper and lower ends of this last-named portion of the lines fall upon the degrees of the thermometer-scale which indicate these temperatures, and finally each of the vertical lines terminating at both end portions, which are the last figures and indicate the highest and lowest temperature reached in a given month, and the ends of these thinned portions of the lines preferably terminating in arrow-heads which fall upon the degrees of the thermometer-scale which indicate this highest or lowest temperature—as, for instance, the normal temperature of the month of January, as here indicated, for an arbitrary number of years is 32° above zero, and the highest mean temperature for this month is 42° above zero, and the lowest mean temperature is 24° above zero; also, as here shown, the highest daily mean temperature for this month is 59° above zero, and the lowest mean temperature is 4° above zero, and finally, as here indicated, the highest temperature reached in this month is 72° above zero, and the lowest temperature reached therein is 5° below zero.

By reference to the vertical lines which indicate any given month in the year it will be seen that the information just described may be had at a glance and may then be compared with the indications of the fluid within the tube of the thermometer, thereby determining without calculation the relative temperature of the present with the average temperature, as well as the extreme temperatures, of a given number of years; and in order that the vertical lines may not be confused as to the month they indicate I prefer to have inscribed upon the face of the chart the name of the month and have this name located next adjacent to the ends of each of the lines.

In practice the number of years which are arbitrarily taken for the determining of the several temperatures may be varied, but usually twenty-five years is that best adapted for the purpose for which my improvement is intended.

It is obvious that the various indicating spots, figures, and lines here described may be placed upon the face of the back in any color or shade, and the background may be either white or any desired tint.

Having thus fully described this invention, what is claimed as new and useful is—

As an article of manufacture, a thermometer, a chart in combination therewith having a series of horizontal lines indicating degrees of the thermometer, a pair of vertical lines on each side of the thermometer, angular spots located between said vertical lines, a pair of vertical lines near each edge of the chart, angular spots therein similar to the others but in a reversed position thereto, numbers set in the margin adjacent to the marginal spots and series of vertical lines between the pairs of vertical lines representing months and being of three different widths, the central or greatest width indicating the extreme monthly mean temperature, the next widest portion indicating the highest and lowest daily mean temperature of that month and the thinnest portion indicating the highest and lowest temperature reached in the month and circles on the lines indicating the normal temperature of the month, as and for the purpose described.

In testimony whereof I have hereunto affixed my signature in the presence of two subscribing witnesses.

JAMES E. BROWN.

Witnesses:
S. S. WILLIAMSON,
MARK BUFORD.